US012799716B2

(12) United States Patent
Heinle et al.

(10) Patent No.: US 12,799,716 B2
(45) Date of Patent: Nov. 17, 2026

(54) METHOD FOR DETERMINING OR ADAPTING A CHARACTERISTIC CURVE OF A HYDRAULIC COMPONENT OR MOBILE WORKING MACHINE

(71) Applicant: Liebherr-Hydraulikbagger GmbH, Kirchdorf/Iller (DE)

(72) Inventors: Philipp Heinle, Kirchdorf/Iller (DE); Bernhard Meitinger, Kirchdorf/Iller (DE); David Keck, Kirchdorf/Iller (DE); Tim Schöne, Kirchdorf/Iller (DE); Martin Oberdorfer, Stuttgart (DE); Oliver Sawodny, Stuttgart (DE)

(73) Assignee: LIEBHERR-HYDRAULIKBAGGER GMBH, Kirchdorf/Iller (DE)

( * ) Notice: Subject to any disclaimer, the term of this patent is extended or adjusted under 35 U.S.C. 154(b) by 293 days.

(21) Appl. No.: 18/617,037

(22) Filed: Mar. 26, 2024

(65) Prior Publication Data

US 2024/0392538 A1 Nov. 28, 2024

(30) Foreign Application Priority Data

May 22, 2023 (DE) ..................... 10 2023 113 243.1

(51) Int. Cl.
*E02F 9/22* (2006.01)
*F15B 19/00* (2006.01)
*F15B 21/08* (2006.01)

(52) U.S. Cl.
CPC .......... *E02F 9/2235* (2013.01); *F15B 19/002* (2013.01); *F15B 21/08* (2013.01)

(58) Field of Classification Search
CPC ..................................................... E02F 9/2235
See application file for complete search history.

(56) References Cited

U.S. PATENT DOCUMENTS 5,079,919 A * 1/1992 Nakamura .............. F16H 61/47 60/426
5,638,677 A * 6/1997 Hosono ................. F16H 61/431 60/434
9,545,901 B2 * 1/2017 Kollmann ................. B60T 8/32
9,995,020 B2 6/2018 Yuan et al.
10,655,650 B2 * 5/2020 Werner ................. E02F 9/2296
(Continued)

FOREIGN PATENT DOCUMENTS

DE 10106464 A1 1/2002
DE 102009020111 A1 11/2010
(Continued)

OTHER PUBLICATIONS

Backe, W. et al., "New possibilities in electro-hydraulic load sensing," O + P : Fluid technology for mechanical and plant engineering, vol. 34, No. 2, Feb. 1990, 10 pages. (Submitted with Partial Machine Translation).

*Primary Examiner* — Michael Leslie
(74) *Attorney, Agent, or Firm* — McCoy Russell LLP

(57) ABSTRACT

The present disclosure relates to a method for determining or adapting a characteristic curve of a hydraulic component or mobile working machine having the following steps:
- determining a volume flow;
- determining a pressure drop;
- determining a replacement parameter of the component from the volume flow and the pressure drop;
- determining or adapting the characteristic curve using the replacement parameter.

17 Claims, 4 Drawing Sheets

(56) References Cited

U.S. PATENT DOCUMENTS

| | | | | |
|---|---|---|---|---|
| 10,774,857 | B2 * | 9/2020 | Neumann | F15B 11/064 |
| 11,530,709 | B2 * | 12/2022 | Klassen | F15B 19/005 |
| 2003/0121409 | A1 | 7/2003 | Lunzman et al. | |

FOREIGN PATENT DOCUMENTS

| | | | | |
|---|---|---|---|---|
| DE | 102014224820 | A1 | 6/2016 | |
| DE | 102011080227 | B4 | 5/2022 | |
| DE | 102022208574 | A1 * | 9/2024 | F15B 11/08 |
| JP | H04351304 | A | 12/1992 | |

* cited by examiner

METHOD FOR DETERMINING OR ADAPTING A CHARACTERISTIC CURVE OF A HYDRAULIC COMPONENT OR MOBILE WORKING MACHINE

CROSS REFERENCE TO RELATED APPLICATION

The present application claims priority to German Patent Application No. 10 2023 113 243.1 filed on May 22, 2023. The entire contents of the above-listed application are hereby incorporated by reference for all purposes.

TECHNICAL FIELD

The present disclosure relates to a method for determining or adapting a characteristic curve of a hydraulic component or mobile working machine.

BACKGROUND

Electrohydraulics are becoming increasingly important in the field of mobile working machines due to improved efficiency, automation of work processes, faster response times, load-independence and fine controllability of movements as well as configurable operator support. Electrohydraulics offer advantages over conventional, purely hydraulic controls.

SUMMARY

In order to achieve a certain system behavior, it is advantageous to know the properties of the (electro) hydraulic components used, such as valves, and to store these in the form of a characteristic curve of the component on the machine control unit.

This is particularly important when controlling individual movements. For example, the flowing volume flow is set as precisely as possible for the precise movement of a hydraulic cylinder. The basis for this is knowledge of the opening cross-section as a function of the position of the associated valve, which can be defined via a characteristic curve. The characteristic curves provided by the component manufacturers are generally not sufficient, as they do not cover all effects that may occur.

Among other things, design-related flow forces in the component, friction effects in pipes and the pump as well as contact resistances in connecting elements have a significant influence on the behavior of the component. It may also be necessary to adjust the characteristic curve due to wear and other time-dependent influences during operation of the working machine.

Against this background, the object of the present disclosure is to provide a method for determining or adapting a characteristic curve of a hydraulic component or mobile working machine.

This object is achieved by the method with the features of the independent claim 1. Advantageous further embodiments of the disclosure are the subject matter of the dependent claims.

Consequently, a method is provided according to the disclosure for determining or adapting a characteristic curve of a hydraulic component or mobile working machine having the following steps:

determining a volume flow;

determining a pressure drop;

determining a replacement parameter of the component from the volume flow and the pressure drop;

determining or adapting the characteristic curve using the replacement parameter.

The term "determining" is to be understood broadly and includes, for example, the terms detecting, calculating and/or measuring. In an example, the determination is performed via instructions stored in memory in a control unit.

Optionally, an identification can also be understood as determining. Optionally, an adaptation can also be understood as determining. In particular, it is conceivable that the adaptation is an online adaptation.

Optionally, it is provided that the volume flow is determined by measuring the volume flow, in particular using a measuring turbine.

Optionally, it is provided that the volume flow is determined from a rotational speed and a displacement volume of a pump, in particular of a hydraulic pump.

Optionally, it is provided that the displacement volume is determined from the pivot angle of the pump and/or from an electric control of the pump, preferably using a pump model.

Optionally, it is provided that the volume flow is determined from a movement of a consumer, in particular a hydraulic cylinder or hydraulic motor, and/or from a volume change of the consumer.

Optionally, it is provided that the movement of the consumer comprises a speed and/or rotational speed and/or in that the volume change is determined from an area, cubature and/or the movement of the consumer.

Optionally, it is provided that the pressure drop is determined by one, two or more than two pressure sensors. In particular, a pressure sensor can be arranged in a pipe system upstream of the component and a pressure sensor can be arranged downstream of the component.

Optionally, it is provided that the characteristic curve is determined or adapted by a Gaussian adjustment calculation, in particular using the least squares method and/or a recursive least squares algorithm.

Optionally, the characteristic curve is determined or adapted by determining more than one replacement parameter, in particular for different positions of the component.

Optionally, it is provided that the replacement parameter is determined from a division of the volume flow by the product of a system parameter and the square root of the difference of a first pressure drop in a first position of the component and of a second pressure drop in a second position of the component. The valve is a continuous valve (proportional valve). As the method runs online over the entire life cycle of the working machine, the replacement parameter is adapted not just for two different positions, but for all possible positions.

Optionally, it is that the system parameter comprises an orifice coefficient and/or a density of a hydraulic fluid.

Optionally, it is provided that the characteristic curve is stored and/or adapted on a machine control unit, for example in non-transitory memory of the control unit.

Optionally, it is provided that the component is or comprises an, in particular electrohydraulic, valve and/or in that the replacement parameter is a replacement cross-section of the valve.

Optionally, it is provided that the characteristic curve is determined or adapted during operation of the working machine. The characteristic curve is therefore determined or adjusted online on the working machine.

The disclosure also relates to a mobile working machine, in particular a hydraulic excavator, which is designed and/or has means for carrying out a method according to the disclosure.

Optionally, the working machine is a construction machine and/or equipped with an electric pump controller.

In other words, it is possible to bundle system influences and take them into account via a theoretical replacement parameter, such as a valve replacement cross-section. Optionally, the method is adaptive, runs online on the machine control unit, reacts to changes and/or thus ensures a defined control behavior over the entire life cycle of the mobile working machine.

At this point it is pointed out that the terms "a" and "one" do not necessarily refer to exactly one of the elements, although this is a possible embodiment, but can also denote a plurality of the elements. Similarly, the use of the plural also includes the presence of the element in question in the singular and, conversely, the singular also includes several of the elements in question. Furthermore, all of the features of the disclosure described herein may be claimed in any combination or in isolation from each other.

BRIEF DESCRIPTION OF THE FIGURES

Further advantages, features and effects of the present disclosure are shown in the following description of preferred exemplary embodiments with reference to the figures, in which the same or similar components are designated by the same reference numerals. In the figures.

DETAILED DESCRIPTION

In a first exemplary embodiment of the method according to the disclosure, the known relationship between volume flow Q, orifice coefficient $\alpha_D$, cross-sectional area A, density ρ and pressure drop Δp at an orifice of a valve is used, which can be represented by the following equation 1:

$$Q = \alpha_D \cdot A \cdot \sqrt{\frac{2}{\rho}} \cdot \sqrt{\Delta p}$$

In a first approximation, the orifice coefficient $\alpha_D$ can be assumed to be constant. The density of the hydraulic fluid ρ is a system parameter of the mobile working machine 8 and can be determined as a function of the operating conditions.

If we now summarize all the existing values in the system parameter CB and reshape the relationship, the area of the valve can be described according to the following equation 2:

$$A = \frac{Q}{c_B \cdot \sqrt{\Delta p}}$$

In order to determine a replacement cross-section of the valve that takes the system parameters and environmental influences into account, the real volume flow $Q_{real}$ and the real pressure drop Δp across the valve are determined online, i.e. during operation of the working machine.

In addition, it is possible to define how and at what frequency the replacement cross-section is determined and thus the characteristic curve is adjusted.

Figure 1:
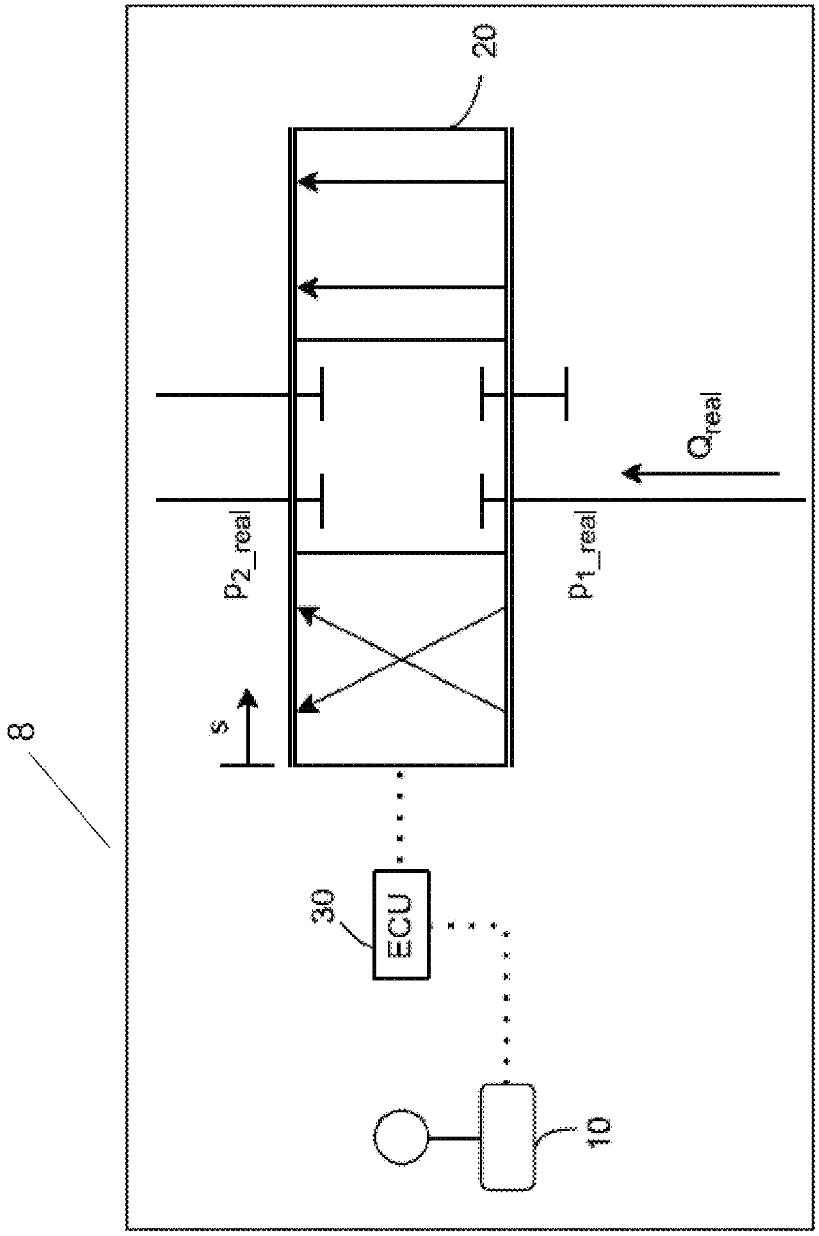
FIG. 1: shows a schematic representation of components of an embodiment of a working machine according to the disclosure.

FIG. 1 shows a highly simplified schematic design of components of an embodiment of a working machine according to the disclosure. The valve 20 controls any movement, such as that of a cylinder.

During operation of the working machine, a desired movement is commanded via the control transmitter 10, translated by the machine control unit (ECU) 30 and forwarded to the valve 20.

Over the course of the machine's entire life cycle, various positions s of the valve 20 are specified.

If the volume flow $Q_{real}$, the pressure $p_{1\_real}$ and the pressure $p_{2\_real}$ are detected for each position s, the respective replacement cross-section $A_{Ersatz}$ can be determined using the following equation 3:

$$A_{Ersatz} = \frac{Q_{real}}{c_B \cdot \sqrt{p_{1\_real} - p_{2\_real}}}$$

In conjunction with the respective position s and a suitable mathematical method that defines a rule for the frequency of determination or adaptation, the characteristic curve of the valve can be determined and/or adapted.

Depending on the performance of the machine control unit 30, various options are available. For example, the Gaussian process and the recursive least squares (RLS) algorithm should be mentioned here.

Figure 2:
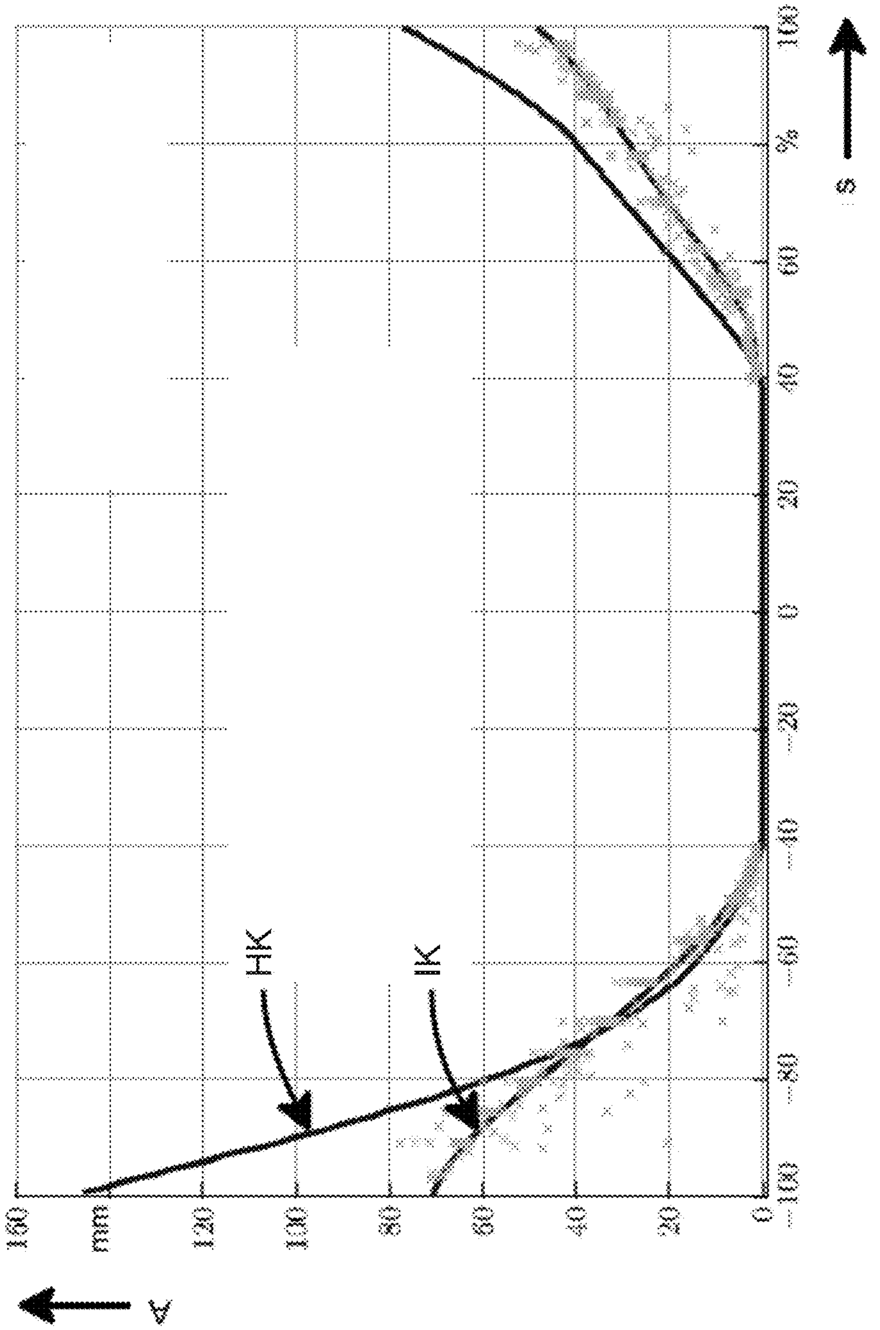
FIG. 2 shows a diagram, which shows a comparison of valve characteristic curves.

FIG. 2 shows an exemplary characteristic curve comparison.

The cross-section A of the valve 20 is shown on the y-axis and the valve position (deflection) s is shown on the x-axis.

In addition to the valve characteristic curve according to the manufacturer's specification HK, the determined replacement cross-sections $A_{Ersatz}$ and the real characteristic curve IK determined and/or adapted from this are shown by small crosses. The determined characteristic curve(s) can then be used to control system operation via the ECU as described herein.

It can be seen that the deviation between the two characteristic curves HK and IK is large, especially with large valve deflection s. In this area in particular, it is advantageous to make an adjustment using the replacement cross-section $A_{Ersatz}$.

Figure 3:
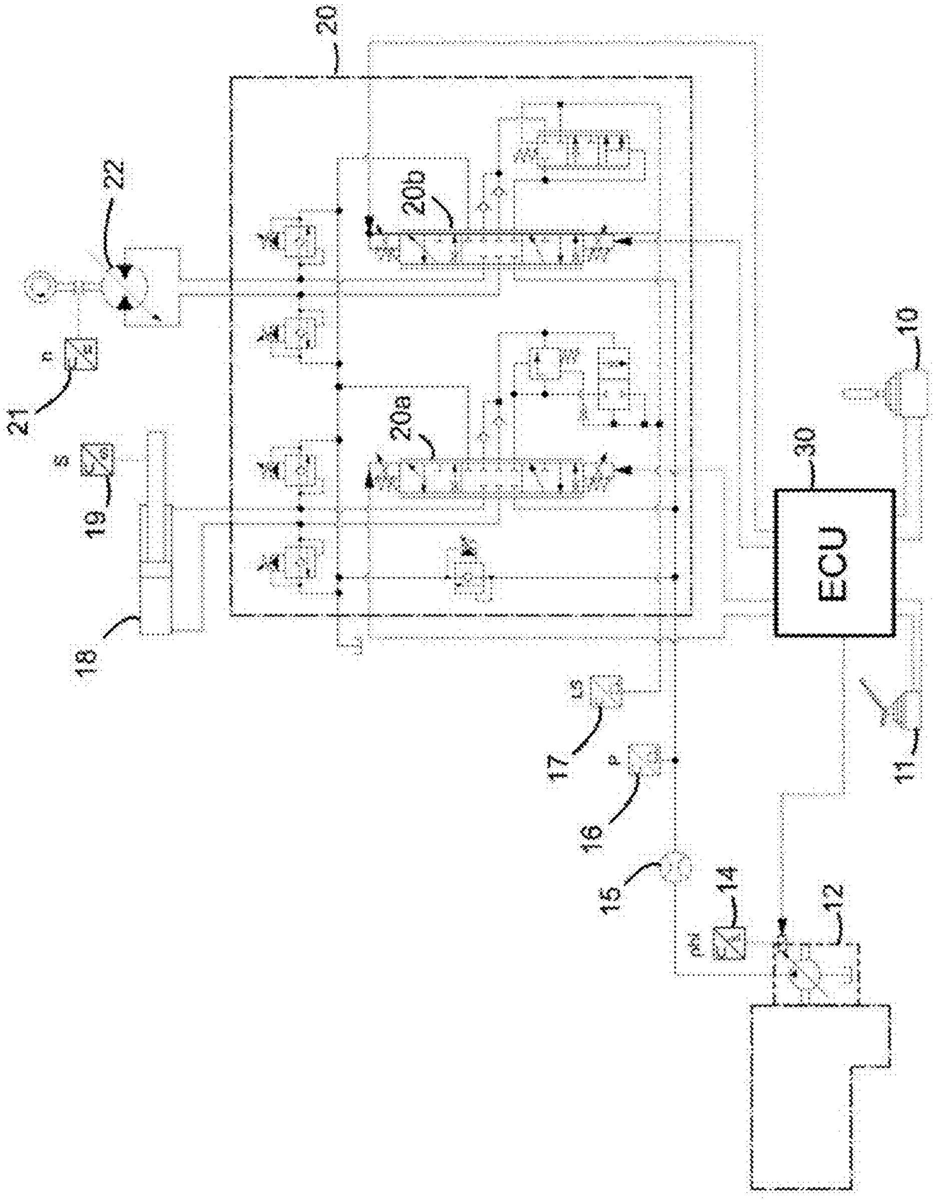
FIG. 3 shows a schematic circuit diagram of components of an embodiment of a working machine according to the disclosure.

FIG. 3 shows the required sensors and elements described for all variants. Depending on the equipment of the working machine, it can be decided which type is used for sensing the real volume flow.

The control transmitter 10 transmits control commands to the machine control unit 30. The input value of a brake pedal 11 for the rotating mechanism is also transmitted to the machine control unit 30.

A pump 12 is also controlled by the machine control unit 30. The pump has a pivot angle sensor 14, which can be used to measure the pivot angle of the pump 12.

The flow rate of the hydraulic fluid between the pump 14 and valve block 20 can be measured using the measuring turbine 15.

The pressure drop across the valve block 20 can be determined by the pressure sensors 16 and 17.

The valve block 20 can control a translatory actuator in the form of a hydraulic cylinder 18 and/or a rotary actuator in the form of a hydraulic motor 22.

The valve block has valve 20*a* for actuating the hydraulic cylinder 18 and valve 20*b* for actuating the hydraulic motor 22.

The movement and/or position of the hydraulic cylinder 18 can be determined using a displacement transducer 19.

The movement and/or position of the hydraulic motor 22 can be determined using a rotational speed sensor 21.

There are various options for sensing the volume flow $Q_{real}$. Depending on the peripherals installed, there is the option of direct or indirect detection of the volume flow $Q_{real}$.

Direct detection is understood to mean measurement of the volume flow by a measuring turbine 15. As a measuring turbine causes additional costs and a permanent pressure drop or energy loss, it is primarily suitable for test and trial purposes.

Indirect detection offers several options for determining $Q_{real}$. This means that the volume flow at the pump 12 can be used as an approximation for $Q_{real}$. This can be calculated from the rotational speed and the displacement of the pump 12. By detecting the motor speed of the pump 12 and knowing the constant transmission ratio of the pump transmission, the rotational speed of the pump 12 is known to the machine control unit 30.

The displacement of pivot pumps is variable and can be detected by a pivot angle sensor 14.

If an electrically controlled pump 12 is used, the pivot angle sensor 14 can be omitted. In this case, it is possible to model the pump behavior and derive the pivot angle and thus the displacement volume from the electrical control $I_{X1}$ of the pump 12.

Figure 4:
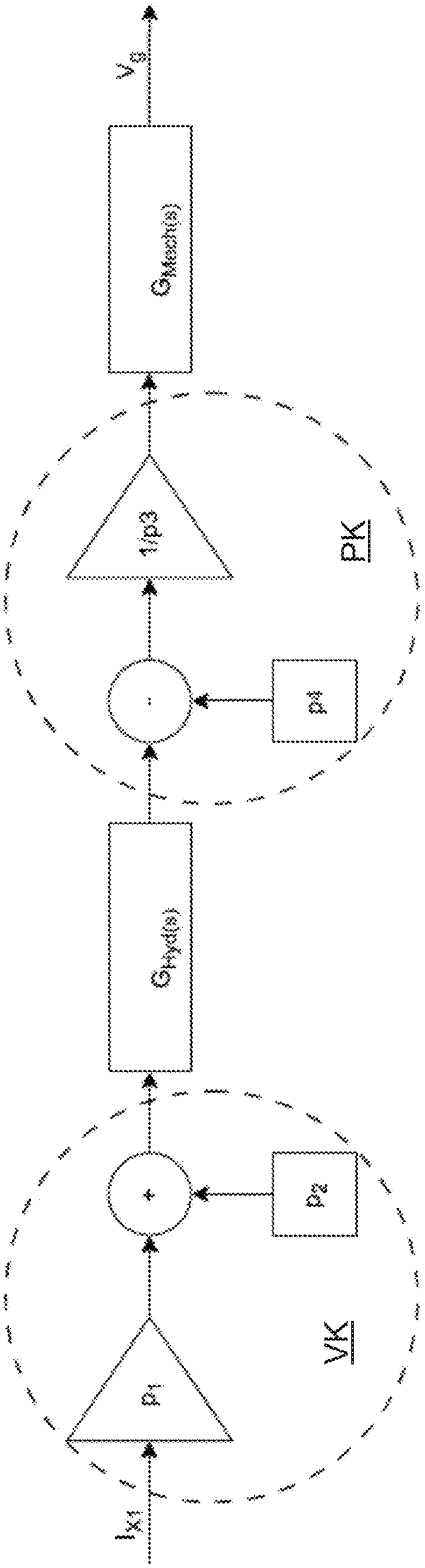
FIG. 4 shows a schematic representation of a modelling approach for the indirect detection of the displacement volume of an electrically pilot-controlled pump.

The relationship between displacement volume $V_g$ and control $I_{X1}$ can be seen in the model in FIG. 4.

In the model, a pressure dynamic $G_{Hyd(s)}$ is determined from a characteristic curve of a pilot valve VK, which serves as an input variable for the characteristic curve of a pump controller PK, from which a pump dynamic $G_{Mech(s)}$ and the displacement volume $V_g$ are determined. The pump controller PK then controls pump operation.

As a further variant for determining $Q_{real}$, the volume flow at a consumer can be used instead of the pump volume flow.

This can be done differently depending on the sensors installed and the type of consumer. In the case of translatory consumers, e.g. in the form of a hydraulic cylinder 18, the speed can be detected with a displacement transducer 19 and the volume flow can be calculated using the geometry or the piston area.

In comparison, in the case of rotary consumers, for example in the form of a hydraulic motor 22, the rotational speed is measured by means of a speed sensor 21 and calculated to the volume flow by means of the cubature.

Pressure sensors 16, 17 are provided to determine the pressure difference Δp.

As already explained, the replacement cross-section includes all parameters and environmental influences of the entire system. However, certain included effects do not occur twice in multi-section operation, such as parallel actuation of a hydraulic cylinder and a hydraulic motor (two section valves). Therefore, if a plurality of cross-sections is considered in parallel operation and used for further calculations, it is advisable to take the unwanted duplication into account. A suitable method for this is a comparative analysis. For this purpose, the determined individual section cross-sections of the valve can be added together and compared with a determined multi-section cross-section. This makes it possible to prevent unwanted, unreal duplication of effects.

The method actions described herein may be implemented as instructions stored in memory of the ECU 30, which ECU communicates via one or more signal lines as illustrated to one or more sensors, transmitters, and actuators as described herein.

LIST OF REFERENCE NUMERALS

10 Control transmitter
11 Brake pedal for the rotating mechanism
12 Pump
14 Pivot angle sensor
15 Measuring turbine
16 Pressure sensor
17 Pressure sensor
18 Hydraulic cylinder
19 Displacement transducer
20 Valve block
20*a* Valve
20*b* Valve
21 Rotational speed sensor
22 Hydraulic motor
30 Machine control unit (ECU)

The invention claimed is:

1. Method for determining or adapting a characteristic curve of a hydraulic component of a mobile working machine, the method comprising:
- determining a volume flow of the hydraulic component;
- determining a pressure drop across the hydraulic component;
- determining a replacement parameter of the hydraulic component from the volume flow and the pressure drop; and
- determining or adapting the characteristic curve using the replacement parameter, wherein the determination or adaptation of the characteristic curve occurs during operation of the working machine, and wherein the characteristic curve defines an opening cross-section of the hydraulic component as a function of position of the hydraulic component.

2. Method according to claim 1, wherein the volume flow is determined by measuring the volume flow.

3. Method according to claim 2, wherein measuring the volume flow includes using a measuring turbine.

4. Method according claim 1, wherein the volume flow is determined from a rotational speed and a displacement volume of a pump.

5. Method according to claim 4, wherein the displacement volume is determined from a pivot angle of the pump and/or from an electric control of the pump.

6. Method according to claim 4, wherein the pump is a hydraulic pump.

7. Method according to claim 1, wherein the volume flow is determined from a movement of a consumer.

8. Method according to claim 7, wherein the movement of the consumer comprises a speed and/or rotational speed and/or in that a volume change is determined from an area, cubature and/or the movement of the consumer.

9. Method according to claim 7, wherein the consumer is a hydraulic cylinder or hydraulic motor.

10. Method according to claim 1, wherein the pressure drop is determined by one, two or more than two pressure sensors.

11. Method according to claim 1, wherein the characteristic curve is determined or adapted by a Gaussian adjustment calculation.

12. Method according to claim 1, wherein the replacement parameter is determined from a division of the volume flow by the product of a system parameter and the square root of the difference of a first pressure drop in a first position of the component and of a second pressure drop in a second position of the component.

13. Method according to claim 12, wherein the system parameter comprises an orifice coefficient, a cross-sectional area and/or a density of a hydraulic fluid.

14. Method according to claim 1, wherein the characteristic curve is stored and/or adapted on a machine control unit.

15. Method according to claim 1, wherein the component is or comprises a valve and/or in that the replacement parameter is a replacement cross-section of the valve.

16. Mobile working machine comprising a machine control unit configured to implement the method according to claim 1.

17. Mobile working machine of claim 16, wherein the mobile working machine is a hydraulic excavator.

* * * * *